United States Patent [19]

Nilssen

[11] Patent Number: 4,939,427
[45] Date of Patent: Jul. 3, 1990

[54] GROUND-FAULT-PROTECTED SERIES-RESONANT BALLAST

[76] Inventor: Ole K. Nilssen, Caesar Dr., Barrington, Ill. 60010

[21] Appl. No.: 299,231

[22] Filed: Jan. 23, 1989

Related U.S. Application Data

[63] Continuation-in-part of Ser. No. 80,865, Aug. 3, 1987.

[51] Int. Cl.$^5$ .................. H05B 37/02; H05B 39/04; H05B 41/36
[52] U.S. Cl. .................. 315/209 R; 315/219; 315/224; 315/311; 315/DIG. 4; 315/DIG. 5; 315/DIG. 7; 361/42; 363/95; 363/132
[58] Field of Search ............. 315/224, 209 R, DIG. 7, 315/311, 224, 186, 205, 244, 219, DIG. 4, DIG. 5; 361/42, 44, 45, 46; 363/95, 131, 136

[56] References Cited

U.S. PATENT DOCUMENTS

| Re. 32,904 | 4/1989 | Pacholok | 315/DIG. 7 |
|---|---|---|---|
| 4,004,187 | 1/1977 | Walker | 315/DIG. 7 |
| 4,005,335 | 1/1977 | Perper | 315/DIG. 7 |
| 4,101,806 | 7/1978 | Alley | 315/278 |
| 4,340,843 | 7/1982 | Anderson | 315/307 |
| 4,507,698 | 3/1985 | Nilssen | 315/DIG. 7 |
| 4,538,095 | 8/1985 | Nilssen | 315/225 |
| 4,560,908 | 12/1985 | Stupp et al. | 315/DIG. 7 |
| 4,567,404 | 1/1986 | Flugan | 315/DIG. 7 |
| 4,684,850 | 8/1987 | Stevens | 315/209 R |
| 4,692,667 | 9/1987 | Nilssen | 315/209 R |

OTHER PUBLICATIONS

IEEE Standard Dictionary of Electrical and Electronics Terms Third Edition p. 220.

Primary Examiner—Eugene R. LaRoche
Assistant Examiner—Michael B. Shingleton

[57] ABSTRACT

A self-oscillating half-bridge inverter is powered from a power-line-operated DC voltage source and has a series-tuned high-Q LC circuit connected across its output. A pair of fluorescent lamps is series-connected across the tank capacitor of the LC circuit. An EMI filter is positioned between the inverter and the power line, thereby to minimize electro-magnetic interference. This same EMI filter also acts to produce a control signal in case a ground fault current were to occur; which control signal is used for preventing the magnitude of the ground-fault current from exceeding acceptable limits.

12 Claims, 1 Drawing Sheet

GROUND-FAULT-PROTECTED SERIES-RESONANT BALLAST

RELATED APPLICATION

Instant application is a Continuation-in-Part of application Ser. No. 07/080,865 filed Aug. 3, 1987.

BACKGROUND OF THE INVENTION

1. Field of the Invention

The present invention relates to series-resonance-loaded inverters having ground-fault-protection and EMI filtering, particularly as used for powering gas discharge lamps.

2. Description of Prior Art

Ballasts with built-in ground-fault-protection means have been previously described, such as in U.S. Pat. No. 4,563,719 to Nilssen.

Ballasts having built-in EMI filtering means also have been previously described, such as in U.S. Pat. No. 4,684,850 to Stevens.

Ballasts using a series-resonance-loaded output have also been previously described, such as in U.S. Pat. No. 4,370,600 to Zansky.

In an inverter where a gas discharge lamp load is parallel-connected across the tank capacitor of a high-Q LC circuit that is resonantly series-excited by a high-frequency voltage output of the inverter, it is necessary to provide some means to protect against the high currents and voltages resulting due to so-called Q-multiplication whenever the lamp load is removed or otherwise fails to constitute a proper load for the LC circuit.

In U.S. Pat. No. 4,370,600 to Zansky, circuit protection is provided by way of providing to the LC circuit an alternative load in the form of a voltage-clamping means; which voltage-clamping means acts to load the LC circuit during any period when the lamp does not constitute a proper load therefor.

The voltage-clamping is accomplished by rectifying the Q-multiplied voltage output of the LC circuit and by applying the resulting DC output to the inverter's DC power source.

However, during any period when voltage-clamping does occur, a relatively large amount of power circulates within the electronic ballast means: from the inverter's output, through the LC circuit, and back into the inverter's DC power source by way of the voltage-clamping means.

SUMMARY OF THE INVENTION

Objects of the Invention

One object of the present invention is that of providing cost-effective means to minimize ground-fault currents.

Another object is that of providing for control means in a series-resonance-loaded inverter ballast.

These as well as other objects, features and advantages of the present invention will become apparent from the following description and claims.

BRIEF DESCRIPTION

A self-oscillating half-bridge inverter is powered from a power-line-operated DC voltage source and has a series-tuned high-Q LC circuit connected across its output. A pair of fluorescent lamps is series-connected across the tank capacitor of the LC circuit. An EMI filter is positioned between the inverter and the power line, thereby to minimize electro-magnetic interference.

This same EMI filter also acts to produce a control signal in case a ground-fault current were to occur; which control signal is used for preventing the magnitude of the ground-fault current from exceeding acceptable limits.

If the lamps were to be disconnected, due to so-called Q-multiplication, the magnitude of the high-frequency current flowing through the LC circuit would tend to increase to destructively high levels. To prevent this from taking place, the 30-35 kHz high-frequency current is controlled by a special negative feedback control circuit operative to manifestly limit the magnitude of this high-frequency current by reducing the forward conduction duty-cycle of the two bridge transistors whenever lamp current is not flowing.

In particular, if the lamps are non-connected or otherwise non-operable, each of the inverter's two transistors — by way of time-averaged negative bias-feedback — operates with a relatively short (ex: 24%) forward conduction duty-cycle. However, as soon as lamp current starts to flow, this duty-cycle is increased to nearly 50% by way of partial cancellation of the negative bias-feedback. As a result, with an unloaded series-tuned high-Q LC circuit connected across the inverter's output, the current through the LC circuit builds up to a certain level and remains there, thereby to provide a substantially fixed-magnitude output voltage suitable for properly starting the fluorescent lamps when indeed they are connected.

The inverter's self-oscillation is effected by way of positive feedback provided via a saturable current transformer for each transistor; and the lengthening/shortening of each transistor's forward conduction duty-cycle is accomplished by decreasing/increasing the magnitude of a negative bias against which each saturable current transformer has to work to drive the base of each transistor.

The frequency of inverter oscillation is affected by the shortening of the transistors' forward conduction duty-cycle: at just under 50% duty-cycle, the frequency of oscillation is about 30 kHz; at 24% duty-cycle, the frequency of oscillation is just over 35 kHz.

DESCRIPTION OF THE PREFERRED EMBODIMENT

Details of Construction

Figure 1:
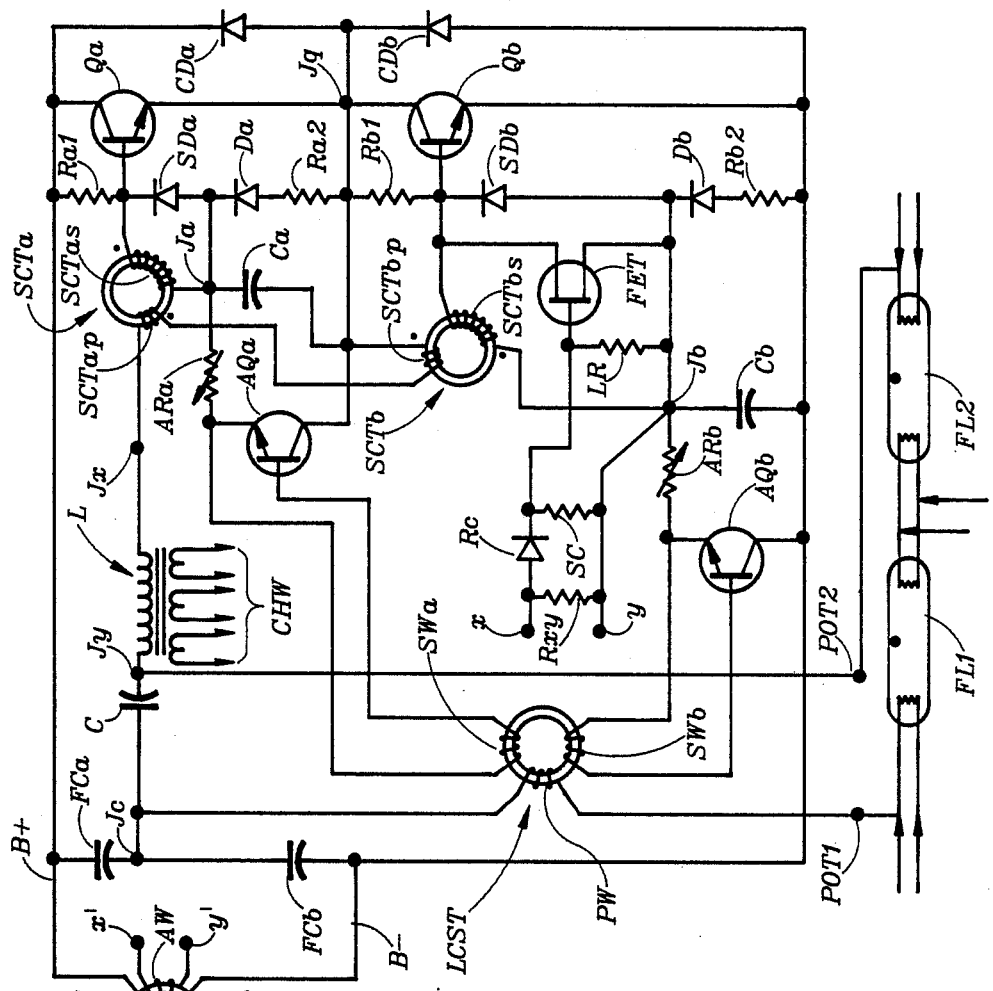
FIG. 1 provides a basic electrical circuit diagram of the preferred embodiment of the invention.

In FIG. 1, a source S of ordinary 120Volt/60Hz power line voltage is applied to power input terminals PITa and PITb; which terminals, in turn, are connected with a bridge rectifier BR. The DC output from bridge rectifier BR is applied to a DC+terminal and a DC−terminal, with the DC+ terminal being of positive polarity. A high-frequency filter capacitor HFFC is connected between the DC+ terminal and the DC− terminal. A first winding W1 of an EMI suppression inductor SI is connected between the DC+ terminal and a B+ bus; and a second winding W2 of EMI suppression inductor SI is connected between the DC− terminal and a B− bus. An auxiliary winding AW is present on EMI suppression inductor SI. A filter capacitor FCa is connected between the B+bus and a junction Jc; a filter capacitor FCb is connected between junction Jc and the B— bus. A switching transistor Qa is connected with its collector to the B+bus and with its emitter to a junction Jq; a switching transistor Qb is connected with its collector to junction Jq and with its emitter to the B— bus. A commutating diode CDa is connected between the B+bus and junction Jq, with its cathode connected with the B+bus; a commutating diode CDb is similarly connected between junction Jq and the B— bus.

A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb have primary windings SCTap and SCTbp, respectively; which primary windings are series-connected between junction Jq and a junction Jx. A resistor Ral is connected between the collector and the base of transistor Qa; a resistor Rbl is connected between the collector and the base of transistor Qb. A capacitor Ca is connected between junction Ja and the emitter of transistor Qa; a capacitor Cb is connected between junction Jb and emitter of transistor Qb. A diode Da is connected with its cathode to junction Ja and, by way of a leakage resistor Ra2, with its anode to the emitter of transistor Qa; a diode Db is connected with its cathode to junction Jb and, by way of a leakage resistor Rb2, with its anode to the emitter of transistor Qb. A shunt diode SDa is connected between the base of transistor Qa and junction Ja, with its anode connected with junction Ja; a shunt diode SDb is similarly connected between the base of transistor Qb and junction Jb.

A tank inductor L is connected between junction Jx and a junction Jy; and a tank capacitor C is connected between junctions Jy and Jc. A power output terminal POT is connected with junction Jc by way of a primary winding PW of a lamp current sensing transformer LCST; another power output terminal POT2 is connected directly with junction Jy. First and second fluorescent lamps FL1 and FL2 are series-connected between power output terminals POT1 and POT2. Tank inductor L has three cathode heater windings CHW; which are connected with the cathodes of fluorescent lamps FL1 and FL2.

An adjustable resistor ARa is connected between junction Ja and the emitter of an auxiliary transistor AQa, whose collector is connected with junction Jq. Likewise, an adjustable resistor ARb is connected between junction Jb and the emitter of an auxiliary transistor AQb, whose collector is connected with the B— bus.

A first secondary winding SWa of transformer LCST is connected between the base and the emitter of auxiliary transistor AQa; and a second secondary winding SWb of transformer LCST is connected between the base and the emitter of auxiliary transistor AQb.

A field effect transistor FET is connected with its drain to the base of transistor Qb and with its source to junction Jb. A leakage resistor LR and a storage capacitor SC are parallel-connected between the gate and the source of this field effect transistor FET. A rectifier Rc is connected with its cathode to the gate of transistor FET and with its anode to a terminal x. A terminal y is connected with junction Jb. A resistor Rxy is connected between terminals x and y; which terminals are respectively connected with terminals x' and y' of auxiliary winding AW of suppression inductor SI.

Details of Operation

The basic operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a squarewave voltage of controllable frequency and with peak-to-peak magnitude about equal to that of the instantaneous magnitude of the DC voltage present between the B— bus and the B+bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit arrangement of FIG. 1, disregarding the effect of auxiliary transistors AQa and AQb, the magnitude of the negative voltage on capacitors Ca and Cb is determined by the magnitude of the current provided at the inverter's output; which is to say, the magnitude of the current flowing through the primary windings of saturable current transformers SCTa and SCTb: the higher the magnitude of the inverter's output current, the higher the magnitude of the negative voltage on capacitors Ca and Cb. Thus, disregarding the effect of auxiliary transistors AQa and AQb, by virtue of the negative bias feedback resulting from the action of resistors Ra2 and Rb2, the circuit of FIG. 1 provides for a high degree of automatic regulation of the magnitude of the inverter's output current. By selecting a suitable resistance value of each of resistors Ra2 and Rb2, the magnitude of the inverter's output current may be adjusted: a relatively low resistance value leads to a current of relatively high magnitude; a relatively high resistance value leads to a current of relatively low magnitude.

More particularly, the higher the magnitude of the inverter's output current, the higher the magnitude of the base current provided to each transistor; and this base current basically has to flow from the bias capacitor (Ca or Cb) associated with each transistor. Thus, a negative voltage will develop on each bias capacitor, and the magnitude of this negative voltage will depend on the magnitude of the base current as well as on the resistance value of the leak-off resistor (Ra2 or Rb2) associated with each bias capacitor.

The higher the magnitude of the negative voltage on each bias capacitor, the higher the magnitude of the voltage that has to be provided from the secondary winding of each saturable current transformer; which, in turn, leads to a correspondingly shorter period before saturation is reached. Thus, as the magnitude of the negative bias on each bias capacitor in increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

With the fluorescent lamps non-connected, no lamp current flows and auxiliary transistors AQa and AQb represent open circuits.

Under that condition, the values of leak off resistors Ra2 and Rb2 are so chosen that the magnitude of the voltage developing across tank capacitor C is suitable for proper lamp starting. Then, when the lamps are indeed connected, they do start (i.e., ignite). However, again disregarding the effect of auxiliary transistors AQa and AQb, the amount of current that will flow through the lamps after ignition will be quite small: typically only about 10% of the rated lamp current. The magnitude of the lamp current will be limited to such a low value for the reason that any additional flow of inverter current (as resulting of the loading represented by the lamps) causes a higher negative bias to develop on each bias capacitor. This effect prevents the lamp current from reaching its full magnitude.

However, the lamp current flows through primary winding PW of lamp current sensing transformer LCST; and, as a result, secondary windings SWa and SWb will provide base drive current to auxiliary transistors AQa and AQb. These transistors will then start to conduct, thereby reducing the magnitude of the negative bias voltage on the bias capacitors (Ca/Cb) and thus permitting the magnitude of the lamp current to increase to a magnitude determined to a significant degree by the resistance values of adjustable resistors ARa and ARb: low resistance values correspond to high-magnitude lamp current, and vice versa.

In case of a ground-fault condition — which typically might occur if fluorescent lamp FL2 were to be connected at its one end with power output terminal POT2 while a ground-connected person held onto the lamp's terminals at its other end — high frequency current would flow out from the ballast at terminal POT2, through the lamp and person to ground, and then eventually back to the ballast by way of one or both of the power input terminals (PIT1/PIT2. Thus, this ground-fault current would have to flow through one or both of windings W1 and W2 of suppression inductor SI. As a result, a corresponding voltage would be developed across auxiliary winding AW; which voltage would be rectified by rectifier Rc and applied to the gate of field effect transistor FET; thereby making transistor FET conductive enough to prevent the inverter from properly operating; thereby, in turn, reducing the magnitude of the ground-fault current to a level low enough to be considered safe.

Due to the effect of storage capacitor SC, as combined with the effect of leakage resistor LR, the voltage presented to the gate of field effect transistor FET will remain high enough to result in a safely low level of ground-fault current for a substantial period of time (ex: 20 seconds) after the ground-fault current was initially reduced.

To prevent the ground-fault protection means — which means consists of elements Rxy, Rc, SC, LR and FET as acting in combination with auxiliary winding AW — from interfering with the inverter's normal operation, which may indeed involve a small amount of ground-fault current, a load resistor Rxy is effectively connected across auxiliary winding AW, thereby providing for a magnitude-threshold below which the ground-fault protection means will not respond.

Figure 2:
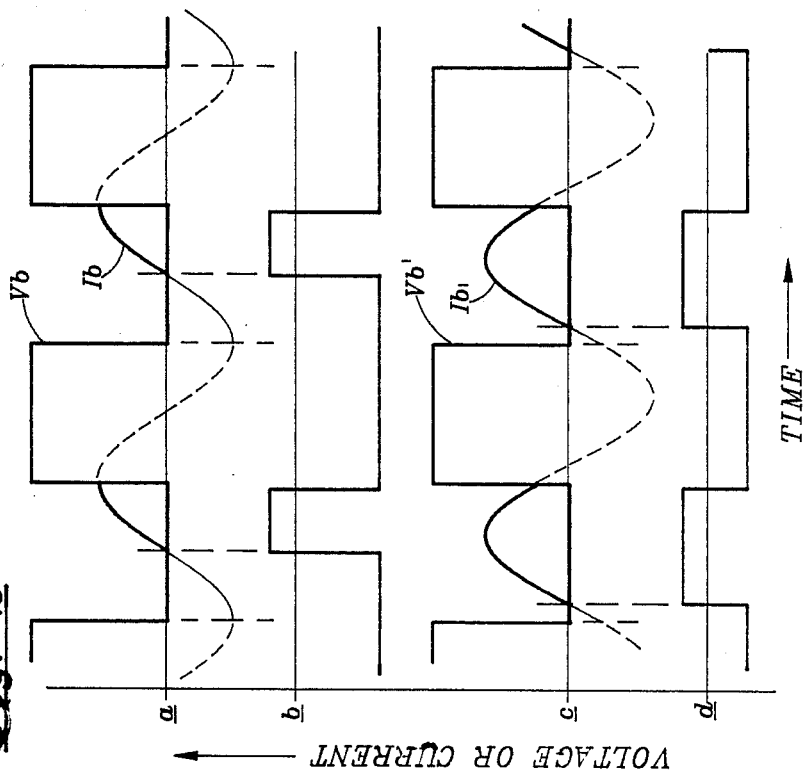
FIG. 2 illustrates waveshapes of various high frequency voltages and currents present within the circuit during different modes of operation.

FIG. 2 depicts various voltage and current waveforms associated with the circuit of FIG. 1.

For a situation with no loading presented to the high-Q LC circuit — that is, with the lamps disconnected, or before the lamps have ignited — FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDb is showed in light solid line, and the part of Ib flowing through either Qa or CDa is shown in light dashed line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDb is showed in light solid line, and the part of Ib' flowing through either Qa or CDa is shown in light dashed line.

FIG. 2d shows the base-emitter voltage of transistor Qb as it corresponds to the waveforms of FIG. 2c.

Additional Comments (a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

(b) The instantaneous peak-to-peak magnitude of the squarewave output voltage provided by the half-bridge inverter between junctions Jq and Jc is substantially equal to the instantaneous magnitude of the DC supply voltage.

(c) Saturable current transformers SCTa and SCTb require only a miniscule amount of voltage across their primary windings. Hence, the magnitude of the voltage-drop between junctions Jq & Jx is substantially negligible, and the inverter's full output voltage is therefore effectively provided across the LC circuit, which consists of tank capacitor C and tank inductor L.

(d) In FIG. 2, the inverter frequency associated with the waveforms of FIGS. 2a and 2b is somewhat higher than that associated with FIGS. 2c and 2d.

Correspondingly, current Ib is nearly 90 degrees out of phase with the fundamental frequency component of voltage Vb, while current Ib' is almost in phase with voltage Vb'.

(e) In the situation associated with the waveform of FIG. 2b, the magnitude of the bias voltage on bias capacitor Ca and Cb is about three times higher than it is in the situation associated with the waveform of FIG. 2d.

Correspondingly, the duration of the transistor ON-time in the situation associated with FIG. 2d is about twice that of the transistor ON-time in the situation associated with the waveform of FIG. 2b.

(f) As may be noticed in FIG. 2a, transistor Qb ceases to conduct in its forward direction while a substantial amount of current is still flowing in the forward direction. After transistor Qb has ceased to conduct, the forward-flowing current will continue to flow until the energy in the tank inductor has dissipated itself, However, the current will continue its flow through commutating diode CDa, thereby discharging its energy into the DC power supply.

(g) Forward conduction of a transistor is defined as current flowing, with the aid of forward base drive current, directly between the collector and the emitter; which, in case of transistor Qb for, instance, means that forward current is defined as positive current flowing from its collector to its emitter while positive drive current is being provided to its base.

A transistor's ON-time is defined as the period during which it conducts current in the forward direction.

(h) For the situations depicted in FIG. 2, the magnitude of the negative bias voltage is the same on both bias capacitors; which implies: (i) that the resistance values of adjustable resistors ARa and ARb are set to be the same, and (ii) that the resistance values of resistors Ra2 and Rb2 are the same.

However, there is no need for the resistance values of resistors ARa and ARb to be set to be the same: quite the contrary. A wide range of inverter power output adjustment is in fact attained by way of adjusting only one of the two adjustable resistors.

With the two adjustable resistors set at different resistance values, the durations of the ON-times of the associated transistors will be correspondingly different: the smaller the resistance value of ARa, the longer the ON-time associated with transistor Qa; the larger the resistance value of ARa, the shorter the ON-time associated with transistor Qa; the smaller the resistance value of ARb, the longer the ON-time associated with transistor Qb; and the larger the resistance value of resistor ARb, the shorter the ON-time associated with transistor Qb.

(i) Also in FIG. 2 it is noted that the fundamental frequency of the waveforms depicted in FIGS. 2c and 2d is somewhat higher than that associated with the waveforms of FIGS. 2a and 2b; yet the indicated duration of transistor ON-time associated with the waveforms of FIGS. 2a and 2b is substantially shorter than the indicated duration of transistor ON-time associated with the waveforms of Figs. 2c and 2d.

In fact, when the transistor ON-time is shortened by a given proportion, the fundamental frequency of the inverter's output voltage increases by a much smaller proportion. In instant case, with each transistor's ON-time shortened by a factor of about two, the inverter frequency increased only by a factor of less than 1.2: from about 30 kHz to just over 35 kHz.

(j) The time constant associated with each bias capacitor and its associated leakage resistor is normally longer than a complete cycle of the high frequency inverter output voltage, and it is typically on the order of several such complete cycles.

For instance, for a situation where the power line input voltage is 120Volt/60Hz, the frequency of the inverter output voltage/current is on the order of 30 kHz, and the total inverter power output falls in the range between 10 and 100 Watt, the values of bias capacitors Ca and Cb might reasonably be in the range from one to ten micro-Farad, the values for leakage resistors Ra2 and Rb2 might reasonably be in the range between 25 and 500 Ohm, and the values of adjustable resistors ARa and ARb might resonably be adjustable over a range between 2-5 Ohm and 25-250 Ohm.

Thus, in general, the magnitude of the bias voltage on the bias capacitors is responsive to the average magnitude of the inverter's output current — normally as averaged over at least a full cycle of this output current.

(k) By properly selecting the operating frequency and the unloaded current-limiting components (Ra2/Rb2) of the ballast circuit of FIG. 1, adequate ground-fault protection may be attained without the need for using the particular ground-fault protection means expressly described therein (which means consists of elements AW, Rxy, Rc, SC, LR and FET).

Instead, by unbalancing the resistance value of resistors Ra2 and Rb2 while maintaining appropriate lamp starting voltage across tank capacitor C, the magnitude of the current available from power output terminal POT2 — under the situation when no lamp current is flowing through primary winding PW of transformer LCST — can be made to be low enough to be considered (ex: by Underwriters Laboratories, Inc.) as substantially free of electric shock hazard.

The magnitude of permissible ground-fault current increases with frequency: being about 30 milli-Ampere RMS at 10 kHz; 90 milli-Ampere RMS at 30 kHz; and 120 milli-Ampere RMS at 40 Kz.

By choosing an inverter frequency of about 40 kHz, and by properly unbalancing the resistance values of resistors Ra2 and Rb2, the ground-fault current can be maintained below 120 milli-Ampere RMS, thereby being adequately low to be considered permissible.

(l) An altogether different approach to eliminating the need for the herein expressly described ground-fault protection means is that of making both the impedance as well as the Volt-Second capability of EMI suppression inductor SI high enough to prevent the magnitude of any ground-fault current flowing out from power output terminal POT2 from exceeding a level that is considered safe from electric shock hazard.

Thus, ground-fault protection may be attained by designing suppression inductor SI overtly such as to be able to sustain the Volt-Second product associated with ground-fault protection; which Volt-Second product is much higher than the Volt-Second product that has to be sustained in connection with EMI suppression.

(m) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   an electric utility power line having power line conductors electrically connected with ground;
   a power conditioner means connected with the electric utility power line and operative to provide a DC voltage at a set of DC terminals; and inverter means connected with the DC terminals by way of an EMI filter means, the inverter means having control means receptive of a control signal and, in absence of the control signal, being: (i) operative to provide a high-frequency AC voltage at a set of AC output terminals, which AC voltage is suitable for powering a load means such as a gas discharge lamp; (ii) apt to produce a flow of ground-fault current if one of the AC output terminals were to be electrically connected with ground, which ground-fault current would then flow between the electric utility power line and the inverter means by way of the power conditioner means and the EMI filter means; and (iii) apt to generate electro-magnetic interference which in the absence of the EMI filter means would flow from the inverter means to the electric utility power line by way of the power conditioner means, the EMI filter means: (i) being operative significantly to reduce the amount of electro-magnetic interference that would flow from the inverter means to the electric utility power line compared to what such amount would have been in the absence of the EMI filter means, (ii) being connected in circuit with said . control means, and (iii) having an auxiliary output operative to provide said control signal in response to the flow of groundfault current.

2. The arrangement of claim 1 wherein the EMI filter means comprises an interference suppression inductor connected in circuit with said auxiliary output.

3. The arrangement of claim 2 wherein the interference suppression inductor is responsive to the flow of ground-fault current and has an auxiliary winding from which the control signal is provided to said auxiliary output.

4. An arrangement comprising:
an electric utility power line having power line conductors electrically connected with ground;
a power conditioner means connected with the electric utility power line and operative to provide a DC voltage at a set of DC terminals, the power conditioner means comprising an EMI filter means; and
inverter means connected with the DC terminals, the inverter means having control means receptive of a control signal and, absent the control signal, being: (i) operative to provide a high-frequency AC voltage at a set of AC output terminals, and (ii) apt to produce a ground-fault current if one of the AC output terminals were to be electrically connected with ground, which ground-fault current would then flow between the electric utility power line and the inverter means by way of the power conditioner means;
the EMI filter means: (i) being operative significantly to reduce flow of electro-magnetic interference from the inverter means to the electric utility power line, and (ii) having an auxiliary output operative to provide said control signal in response to said flow of ground-fault current.

5. The arrangement of claim 4 wherein the EMI filter means comprises an inductor means that serves as: (i) a means for reducing flow of electro-magnetic interference from the inverter means to the electric utility power line, and (ii) a sensor means responsive to said flow of ground-fault current and operative to provide said control signal at said auxiliary output.

6. The arrangement of claim 4 wherein, on receipt of said control signal, the inverter means responds in such a way as to cause a reduction in the magnitude of the ground-fault current.

7. The arrangement of claim 4 combined with gas discharge lamp means connected with the AC output terminals.

8. The arrangement of claim 4 wherein the inverter means comprises a periodically switched semiconductor means connected in circuit between the DC terminals and the AC output terminals.

9. The arrangement of claim 4 wherein the inverter means comprises tuned LC circuit means connected in circuit with the AC output terminals, the tuned LC circuit means having a natural resonance frequency at or near the fundamental frequency of the AC voltage.

10. An arrangement comprising:
an electric utility power line having power line conductors electrically connected with ground;
a power conditioner means connected with the electric utility power line and operative to provide a DC voltage at a set of DC terminals, the power conditioner means comprising an EMI filter means; and
inverter means connected with the DC terminals and operative: (i) to provide a high-frequency AC voltage at a set of AC output terminals, and (ii) to produce a ground-fault current in the event that one of the AC output terminals were to be electrically connected with ground, which ground-fault current would then flow between the electric utility power line and the inverter means by way of the power condition
the EMI filter means being operative: (i) significantly to impede flow of electro-magnetic interference from the inverter means to the electric utility power line, and (ii) in cooperation with the inverter means, to limit the flow of any ground-fault current to a level that is substantially safe from electric shock hazard.

11. The arrangement of claim 10 wherein the frequency of the AC voltage is on the order of 10 kHz or higher.

12. The arrangement of claim 11 wherein the EMI filter constitutes a substantial impedance against the flow of ground-fault current, this impedance being sufficient to prevent the magnitude of any ground-fault current from exceeding said level.

* * * * *